H. GROB.
BELT TIGHTENER.
APPLICATION FILED AUG. 27, 1912. RENEWED MAR. 9, 1918.
1,319,066.
Patented Oct. 21, 1919.
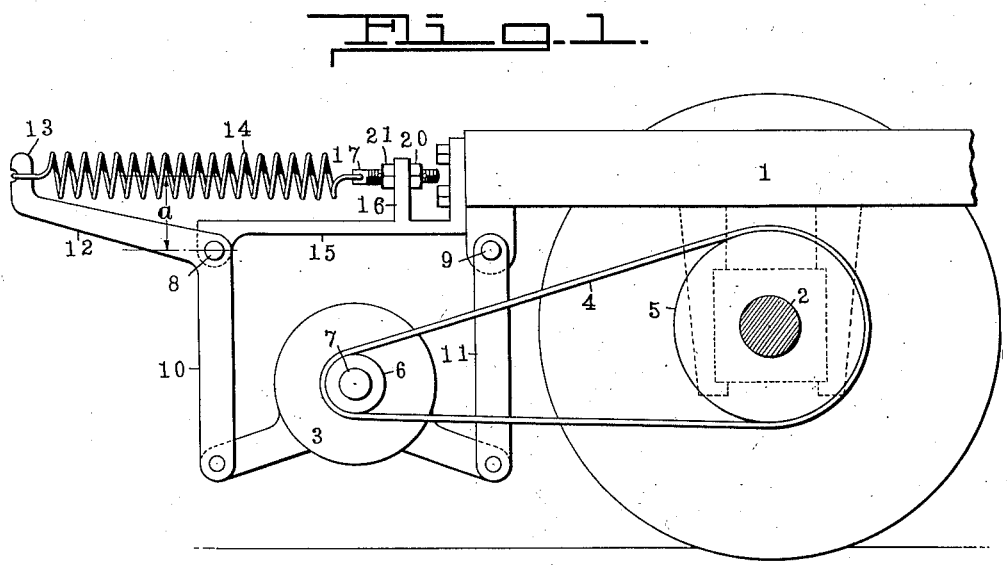
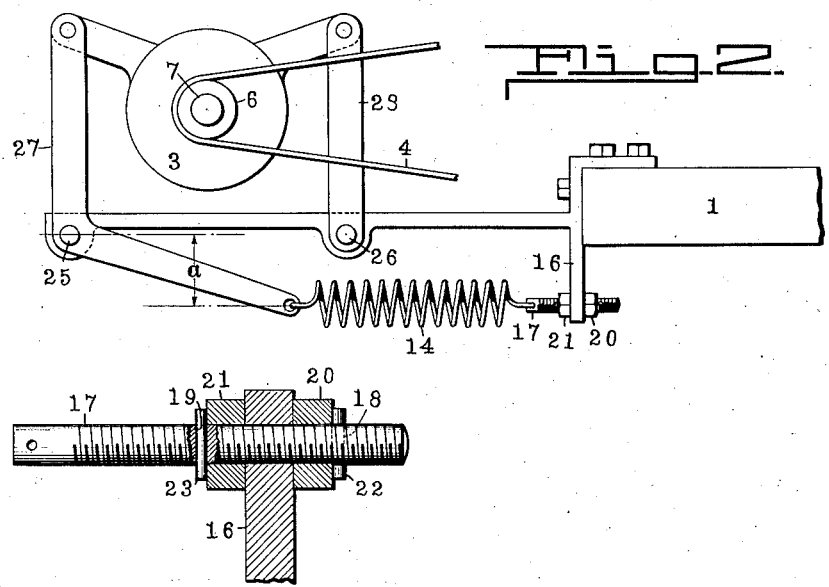
WITNESSES
INVENTOR
Hugo Grob
BY
Dull, Warfield & Dull
ATTORNEYS

UNITED STATES PATENT OFFICE.

HUGO GROB, OF FÜRSTENWALDE, GERMANY.

BELT-TIGHTENER.

1,319,066.   Specification of Letters Patent.   Patented Oct. 21, 1919.

Application filed August 27, 1912, Serial No. 717,234. Renewed March 9, 1918. Serial No. 221,580.

*To all whom it may concern:*

Be it known that I, HUGO GROB, a citizen of the Swiss Confederation, residing at Fürstenwalde, in the Empire of Germany, have invented certain new and useful Improvements in Belt-Tighteners, of which the following is a full, clear, and exact description, such as will enable others skilled in the art to which it appertains to make and use the same.

This invention relates to driving devices for electric generators and with respect to its more specific features, to the belt driving devices of dynamo machines employed in train lighting.

One of the objects of the invention is the provision of a practical and efficient device for maintaining a substantially constant belt tension despite variations in the length of the belt. Another object is the production of a simple device permitting relative movement of the dynamo and the motor means employed to drive it, without substantially varying the belt tension. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein is shown one of the various possible embodiments of this invention, Figure 1 represents a side elevation showing a dynamo mounted upon a car truck and driving connections for the dynamo;

Fig. 2 illustrates a second typical embodiment of the invention;

Fig. 3 is a sectional view of a detail.

In electrically lighting cars or trains of cars by means of dynamos it is difficult to efficiently maintain uniform operation of the dynamo, the difficulties being especially noticeable when the dynamo is driven by a belt. Oftentimes, when one belt is substituted for another it is of a different length from the first and individual belts are subject to variation in length due to stretching, atmospheric causes, etc., these variations resulting either in a slipping of the belts or an over-loading of the belt and bearings. The present invention seeks to automatically maintain a constant belt tension, whether for the same or a different belt.

Referring now more specifically to the drawings, numeral 1 represents a car truck which is provided with the usual car axle 2 from which latter motion is transmitted to a dynamo 3 by means of any efficient power transmitting means. It will be understood that the truck, its axle and wheels are of conventional form. In the present embodiment the means for transmitting power from the car axle to the dynamo, or generator, 3, comprises a driving belt 4 operatively connecting a driving pulley 5 on the axle 2 with a belt pulley 6 on the armature shaft 7 of the dynamo. While the power transmitting means may be of any efficient type capable of transmitting power from the car axle, or motor means, to the dynamo, it preferably comprises a friction driving element such as a belt of the usual type.

Inasmuch as variations in length of a belt are especially contemplated in the present embodiments and as it would be impracticable to vary the position of the car axle on the truck, the dynamo is so mounted upon the truck as to be capable of movement relative to the car axle, or motor, which drives the dynamo, and means are provided whereby upon variation in length of the belt the pulling force acting on the belt will be substantially maintained constant.

As illustrated in Fig. 1 the dynamo is supported on a plurality of axes 8 and 9 by means of links 10 and 11. Preferably there are two pairs of these links, but of course any number may be used. One of the links, for example 10, is formed with an arm 12, having an upwardly projecting end 13, to which a tension spring 14 is connected. Upon a bracket 15, which affords a support for link 10 is a lug 16, which serves as a means for retaining the other end of spring 14.

A convenient means for adjustably connecting spring 14 and lug 16 is shown in the detail view, Fig. 3, and comprises a threaded pin 17, to which the spring is connected, and provided with positioning nuts 20, 21. The pin has also means to indicate when the spring has acquired correct position. In the present instance, this indicating means comprises openings 18 and 19 in the pin, which, when they register with the outer ends of the operating nuts 20 and 21, indicate that the spring is correctly set. Removable pins 22 and 23 may be inserted in the openings in order to positively maintain the spring in the desired position.

By the above-described construction it will be perceived that rotating of the dynamo on the pivotal axes 8 and 9 toward or from axle 2 results in movement of the dynamo in a vertical plane, and when the dynamo is so moved away from its central position, there will be a tendency for it to return to its position under the influence of gravity or its own weight. When the belt 4 elongates, or when a longer belt is substituted for a shorter one, proper tension of the belt may be secured by moving the dynamo in the proper direction around pivotal axes 8 and 9 away from the car axle. If the dynamo then occupies a position to the left of the normal position shown in the drawings, gravity acting upon the dynamo tends to slacken the belt. When a shorter belt is employed or when an individual belt shortens for any reason, the dynamo turns around its pivotal axes 8 and 9 in the opposite direction to that just referred to, and tends to approach the car axle. If the dynamo then occupies a position to the right of its normal or central position, gravity acting upon the dynamo tends to increase the tension on the belt. It will, therefore, be seen that in the present embodiment a horizontal displacement of the dynamo results in a change in the elevation thereof, and that as the dynamo tends to shift to its lowest position gravity increases or reduces the belt tension. Generally speaking, this displacement force, due to gravity, is greater the farther the dynamo is removed from its lowest position, and consequently the entire belt tension is changed by an amount corresponding to the horizontal displacement of the dynamo from mid-position.

As in the central position of the dynamo there is practically no belt tension due to the weight of the dynamo, the spring 14 is employed to provide this tension, and in one aspect of this invention the same means is utilized to counteract any tendency of the weight of the dynamo to change the belt tension. Although a spring has been shown for this purpose, in the present embodiment, it will be understood that any other suitable means might be utilized; for example, a weight. It will furthermore be seen that the spring 14 is so connected with the dynamo as to effect, or influence, the belt tension. Any variation or change in the effect of the spring on the tension of the belt is in the reverse sense, or opposed, to the variation of the belt tension effected by the weight of the dynamo. The relative arrangement of the spring is such that, as the dynamo rotates, the distance $a$ between the line of the force exerted by the spring and the fulcrum point 8 increases or decreases, depending upon the direction of movement.

In the embodiment illustrated in Fig. 1, the lengthening of the belt 4 will result in a movement of the dynamo to the left, and a movement of the arm 12 around its pivot 8, thus increasing the distance $a$ between the fulcrum and the longitudinal axis of the spring. It will be observed that the degree of the belt tension produced by the spring is dependent on this distance $a$, and that this distance will be greater (within working limits) the farther the dynamo is forced toward the left. The proportionate dimensions may be so adjusted that, on the displacement of the dynamo, the increment in the belt tension produced by the spring will be substantially equal to the decrement in belt tension, due to the weight of the dynamo, and vice versa, so that, within practical limits, the belt tension will be substantially constant for all positions of the dynamo. Furthermore, the weakening of the spring, due to its relaxation, can be efficiently counteracted by a more rapid increase of the lever arm $a$, this latter increasing at a greater rate the farther the arm 12 moves upward.

In this manner the setting of the spring to different spring tensions for different positions of the dynamo, or different lengths of the belt is entirely avoided, the changing lever arm or distance $a$ making it unnecessary. Once the correct or predetermined position of the spring is ascertained, it is only required to set the spring in the indicated position for any length of time, and, in the present embodiment, this position may be conveniently obtained by means of the threaded pin 17, to which the spring is connected, the pin, as before described, having means to indicate when the spring has acquired correct position.

In Fig. 2 the construction is similar in general to that illustrated in Fig. 1. The dynamo in this instance, however, is suspended from axes 25 and 26, by means of links 27 and 28, so that its center of gravity is above its points of support. The operation of this modification is similar in principle to that described in connection with Fig. 1, but in this arrangement the effective action of the spring decreases as the dynamo swings away from the axle, and increases as the dynamo swings toward the axle.

Thus by the above described constructions are accomplished, among others, the objects hereinbefore stated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In apparatus of the character described, in combination, a dynamo, a belt adapted to drive the same, a spring, means whereby the weight of said dynamo affects the tension of said belt comprising a plurality of pivoted links, means by which the dynamo is attached to said links, and a part connected with one of said links to which said spring is connected, the aforesaid parts being so disposed that as the links rotate the line of the force exercised by the spring changes its distance from the pivot of the link to which it is attached in such a manner as to compensate by changes in its effect on belt tension for changes affecting said tension due to the weight of the dynamo.

2. In apparatus of the character described, in combination, a dynamo, a belt adapted to drive the same, a spring, means whereby the weight of said dynamo affects the tension of said belt comprising a plurality of links, means by which the dynamo is attached to said links, and an extension upon one of said links to which said spring is connected, the aforesaid parts being so disposed that as the links rotate the line of the force exercised by the spring increases its distance from the axis of the link to which it is attached in such a manner as to compensate by changes in its effect on belt tension for changes affecting said tension due to the weight of the dynamo.

3. In apparatus of the character described, in combination, a dynamo, a belt adapted to drive the same, a spring, means whereby the weight of said dynamo affects the tension of said belt comprising a plurality of links, means by which the dynamo is attached to said links, and a part connected with one of said links to which said spring is connected, the aforesaid parts being so disposed that as the links rotate the line of the force exercised by the spring decreases its distance from the axis of the link to which it is attached in such a manner as to compensate by changes in its effect on belt tension for changes affecting said tension due to the weight of the dynamo.

4. In apparatus of the character described, in combination, a dynamo, a belt adapted to drive the same, a spring, means whereby the weight of said dynamo affects the tension of said belt comprising a plurality of rotatable members forming supporting elements for the dynamo, one of said rotatable members being connected to the spring, the aforesaid parts being so disposed that as the rotatable members rotate the line of the force exercised by the spring changes its distance from the axis of the rotatable member to which it is attached in such a manner as to compensate by changes in its effect on belt tension for changes affecting said tension due to the weight of the dynamo.

5. In apparatus of the character described, in combination, a dynamo, a belt adapted to drive the same, a plurality of pivoted links forming supporting elements for the dynamo and movably connected with the dynamo, a spring connected to one of said links adapted to affect the belt tension and so disposed that as the belt elongates the distance of the line of the force of the spring from the pivot of the link to which it is attached changes in such a manner that the belt tension will remain practically constant.

6. In apparatus of the character described, in combination, a dynamo, a belt adapted to drive the same, a plurality of pivoted links forming supporting elements for the dynamo and movably connected with the dynamo, a spring connected to one of said links adapted to affect the belt tension and so disposed that as the belt elongates the line of force exercised by the spring increases in distance from the pivot of the link to which it is attached.

7. In apparatus of the character described, in combination, a dynamo, a belt adapted to drive the same, a plurality of pivoted links forming supporting elements for the dynamo and movably connected with the dynamo, a spring connected to one of said links adapted to affect the belt tension and so disposed that as the belt shortens the line of the force exercised by the spring decreases in distance from the pivot of the link to which it is attached.

8. In apparatus of the character described, in combination, a dynamo, a suspension therefor comprising a plurality of pivoted links, a belt adapted to drive the dynamo, means adapted to affect the belt tension and means whereby variations in the effect of the first mentioned means on the belt tension compensate for variations of belt tension caused by displacement of said links from their normal position, said means comprising an element connected to one of said links and to said first mentioned means.

9. Apparatus of the character described, comprising in combination, a dynamo, a belt adapted to drive the same, means adapted to offset variations in the belt tension to maintain constant said tension, and means adapted to indicate the setting of said first means.

10. Apparatus of the character described, comprising in combination, a dynamo, a belt adapted to drive the same, a spring adapted to maintain constant the belt tension with changes in the length of the belt, a rotatable element connected to the spring and to the dynamo, and means adapted to indicate a predetermined setting of the spring.

In testimony whereof I affix my signature, in the presence of two witnesses.

HUGO GROB.

Witnesses:
    J. W. ANDERSON,
    H. WATSON.